United States Patent [19]

Kraus

[11] 4,444,068
[45] Apr. 24, 1984

[54] INFINITELY VARIABLE TRACTION ROLLER TRANSMISSION

[75] Inventor: Charles E. Kraus, Austin, Tex.
[73] Assignee: Excelermatic Inc., Austin, Tex.
[21] Appl. No.: 343,906
[22] Filed: Jan. 26, 1982
[51] Int. Cl.³ .................. F16H 15/40; F16H 15/08
[52] U.S. Cl. .......................................... 74/200; 74/190
[58] Field of Search .................. 74/194 J, 190, 200, 74/201, 199, 206, 208, 721, 99 A, 99 I, 424.8 UN, 190.5; 92/31 R

[56] References Cited

U.S. PATENT DOCUMENTS

| | | | |
|---|---|---|---|
| 2,748,614 | 6/1956 | Weisel | 74/190.5 |
| 2,875,632 | 3/1959 | O'Rourke | 74/424.8 R |
| 2,942,580 | 6/1960 | Sirave | 74/99 I |
| 3,087,348 | 4/1963 | Kraus | 74/200 |
| 3,523,564 | 8/1970 | Jonsson | 92/31 |
| 3,570,317 | 3/1971 | Kraus | 74/200 |
| 3,810,398 | 5/1974 | Kraus | 74/200 |
| 3,841,173 | 10/1974 | Kraus | 74/206 |
| 4,086,820 | 5/1978 | Kraus et al. | 74/200 |
| 4,196,654 | 4/1980 | Stearns | 92/31 |
| 4,275,610 | 6/1981 | Kraus | 74/201 |

FOREIGN PATENT DOCUMENTS 939478  7/1949  Fed. Rep. of Germany ........ 74/200

*Primary Examiner*—Lawrence J. Staab
*Assistant Examiner*—Michael David Bednarek
*Attorney, Agent, or Firm*—Klaus J. Bach

[57] ABSTRACT

In a traction roller transmission in which motion is transmitted from an input shaft to an output shaft by traction rollers arranged between, and in engagement with, opposite toric discs, the traction rollers are supported by pivot trunnions which have ball screw structures associated therewith in order to provide a predetermined axial position for one part with respect to the other part of the ball screw structure which is connected to the trunnion for pivotal and axial movement therewith.

4 Claims, 3 Drawing Figures

INFINITELY VARIABLE TRACTION ROLLER TRANSMISSION

BACKGROUND OF THE INVENTION

The invention relates to traction roller transmissions in which motion is transmitted from an input shaft to an output shaft by traction rollers arranged between, and in engagement with, toric discs mounted opposite each other on the input and output shafts.

In such transmissions, the traction rollers are supported on support trunnions which permit pivoting of the traction rollers for adjustment of different transmission ratios. A change of the transmission ratio is initiated by slight axial movement of the trunnions in either axial direction out of their center positions, which movement causes the traction rollers to climb to different circles of engagement with the toric discs. When a new desired transmission ratio is reached, the trunnions return to their axial center positions while the trunnions with the traction rollers remain pivoted in their new transmission ratio position. Axial movement of the trunnions is suitably obtained by hydraulic means such as cylinder and piston structures which are arranged axially adjacent the trunnions to apply axial precess forces thereby by controlling admission of pressurized fluid to the cylinder and piston structures. In order to facilitate proper ratio adjustment, the trunnions are preferably provided with cam structures which cause the cam followers to have a predetermined position for each pivot position of the associated trunnions. Such cam structures however are relatively bulky and relatively expensive to manufacture.

SUMMARY OF THE INVENTION

In a traction roller transmission in which motion is transmitted from an input shaft to an output shaft by traction rollers arranged between, and in engagement with, opposite toric discs, the traction rollers are supported by pivot trunnions which have ball screws associated therewith in order to provide a predetermined axial position for one part with respect to the other part of the ball screw which is connected to the trunnion for pivotal and axial movement therewith. Ball screws are very simple, inexpensive and reliable elements which require very little space and, in fact, could be at least partially formed within the trunnion. Precess forces could be applied to the ball screw or they could be applied directly to the trunnions while the ball screw structure is used to control the application of precess forces.

DESCRIPTION OF THE PREFERRED EMBODIMENTS

Figure 1:
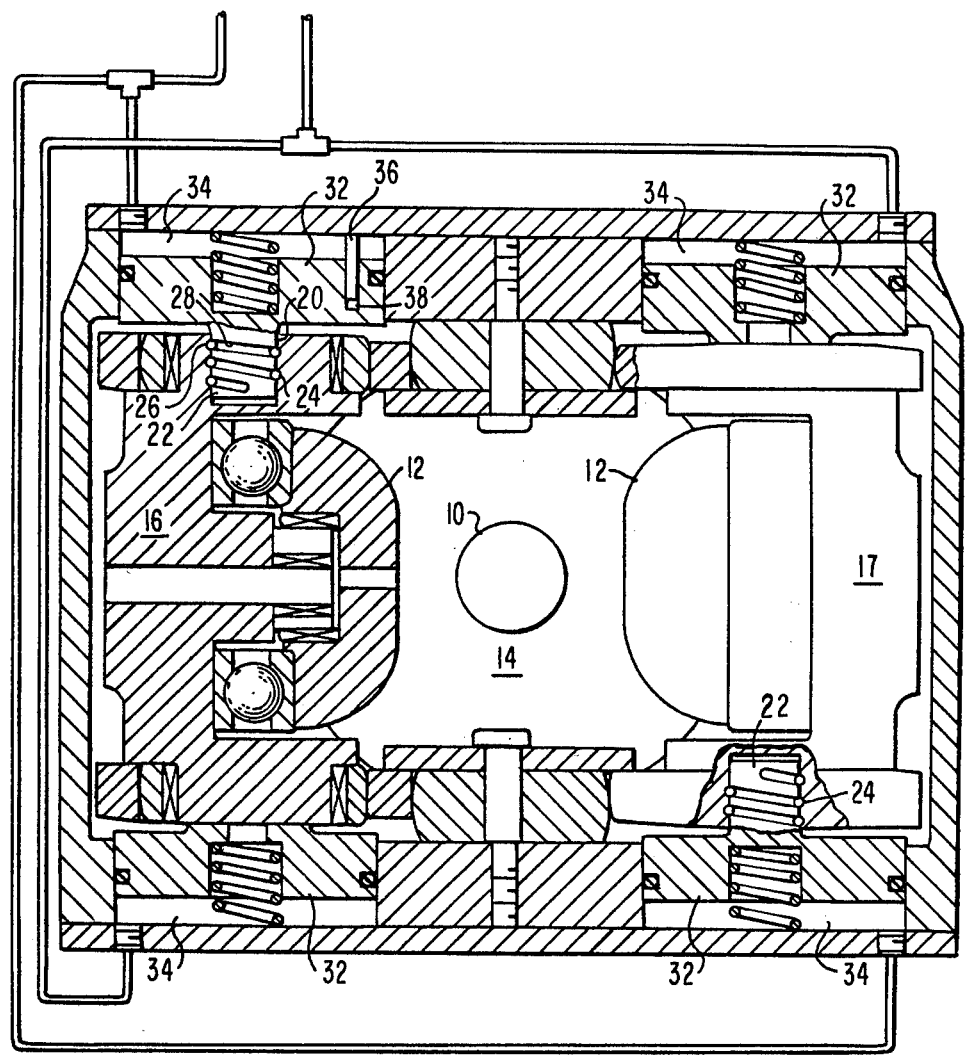
FIG. 1 shows a traction roller transmission in which which precess forces are applied to the trunnions by way of ball screws.

Infinitely variable traction roller transmissions of the type with which the present invention is concerned are disclosed and described in detail in the present inventor's U.S. Pat. Nos. 4,275,610; 4,086,820 and 3,810,398 and earlier application Ser. No. 168,521. In principle, they consist of coaxial input and output shafts 10 which have toric discs 14 mounted thereon opposite each other with traction rollers 12 disposed therebetween and in engagement therewith. The traction rollers 12 are rotatably supported on pivotal support trunnions 16 and 17 which are supported movably in axial direction for initiation of a transmission ratio change.

At least at one end, each trunnion 16, 17 is provided with a ball screw structure consisting of a threaded opening 20 in the trunnion 16 receiving a threaded screw 22 with balls 24 disposed in the ball screw grooves 26, 28. The screw 22 projects from a piston 32 disposed in a cylinder 34 to which hydraulic fluid under pressure is admitted to provide for transmission ratio changing precess motion of the trunnion 16, 17. The piston 32 is prevented from rotation by engagement with retention means such as a pin 36 extending into a bore 38 in the piston 32.

Figure 2:
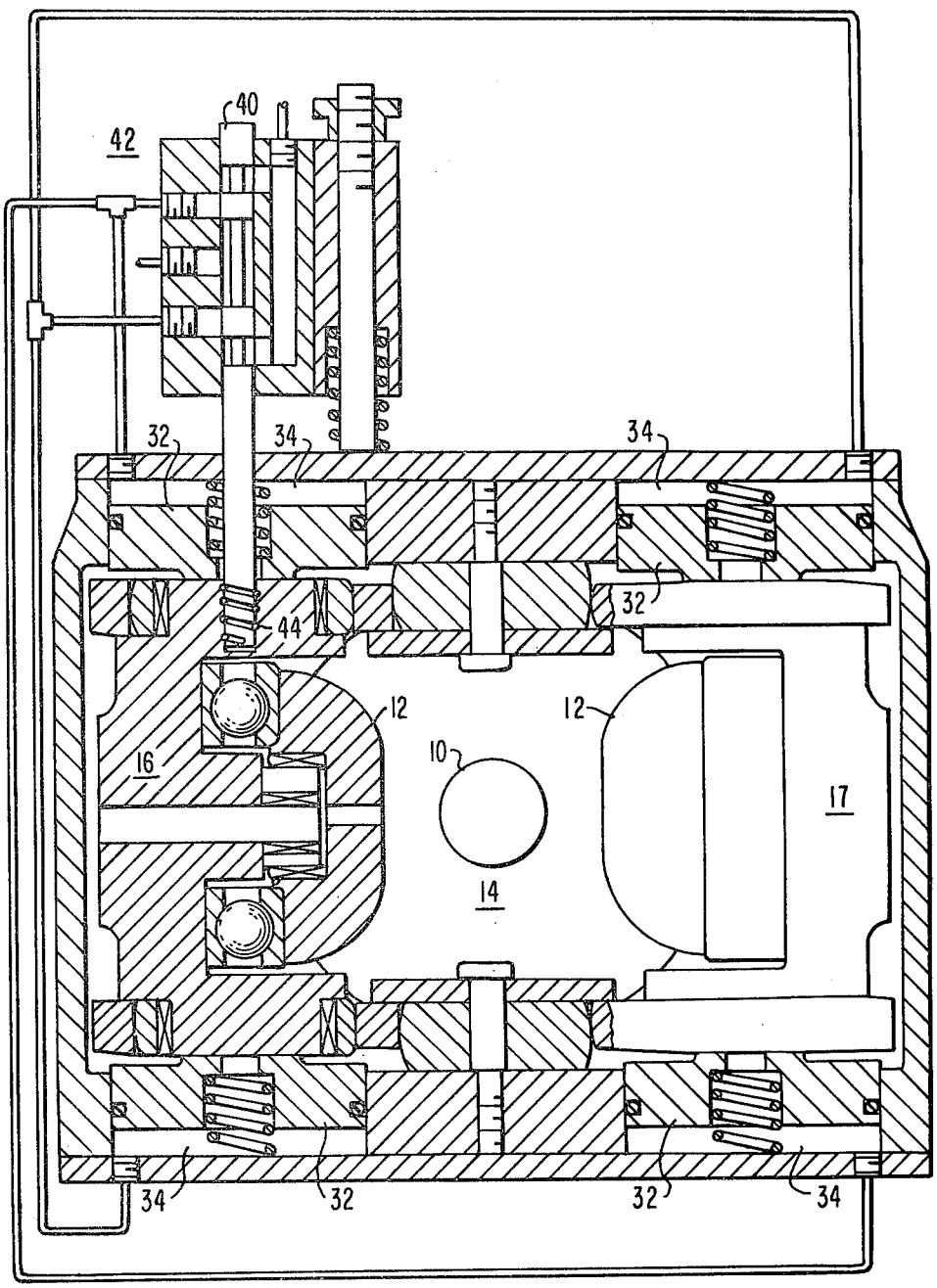
FIG. 2 shows an arrangement, in which hydraulic precess forces are directly applied to the trunnions and a ball screw structure is used to operate a hydraulic control valve controlling admission of pressurized fluid to the precess piston and cylinder.
Figure 3:
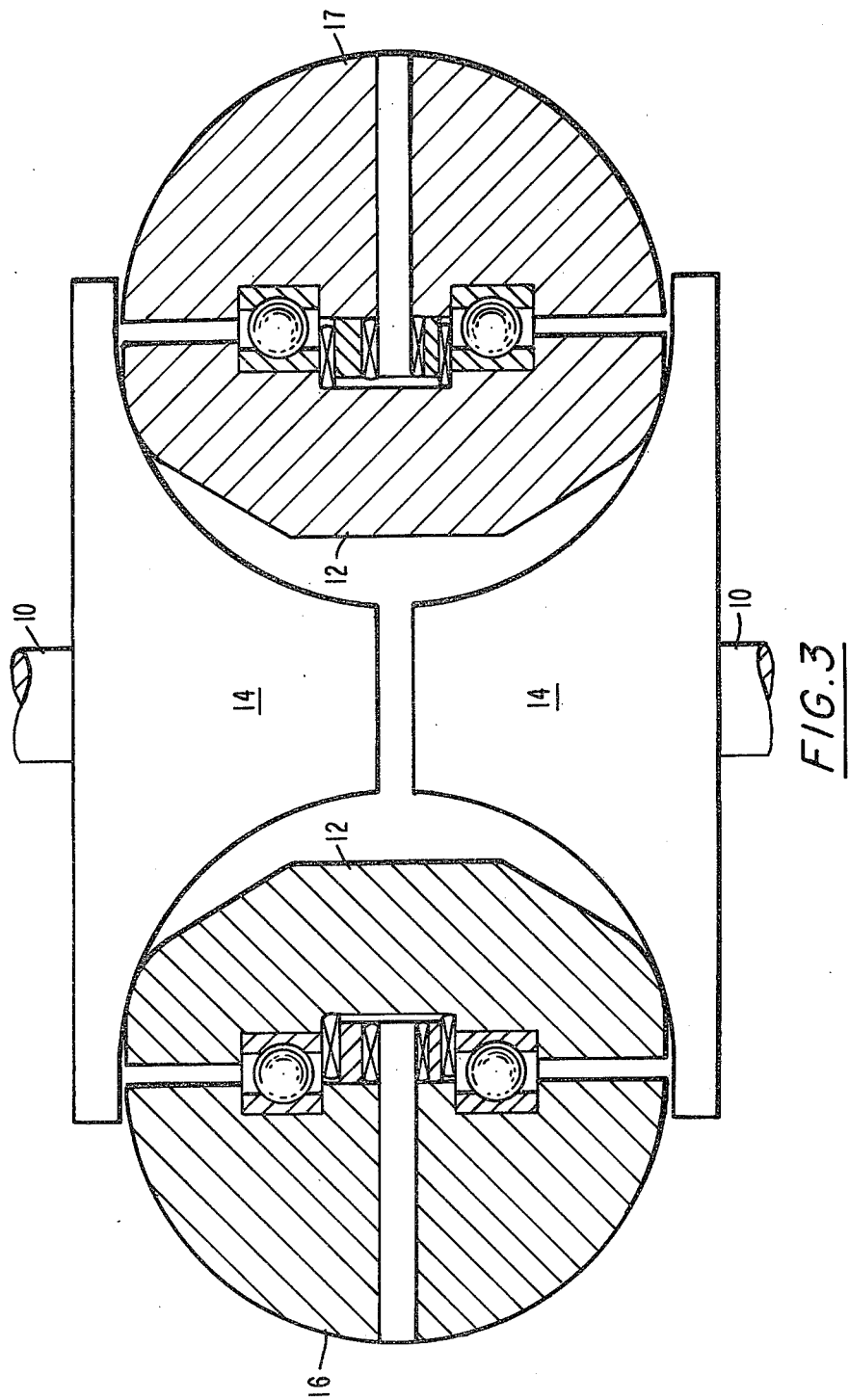
FIG. 3 is a cross-sectional view showing the toric input and output discs with the traction rollers engaged therebetween.

The arrangement shown in FIG. 2 is essentially the same as that shown in FIG. 1 as far as the transmission per se is concerned. Here, however, the piston 32 abuts the trunnion 16 such that precess forces are directly applied to the trunnion 16. The stem 40 of a control valve structure 42 extends through the cylinder 34 and through the piston 32 and has an end portion extending into the trunnion 16 with which it is engaged by means of a ball screw structure 44. Again the stem 40 is prevented from rotation but is axially movable and, at its free end extends into the fluid flow control valve 42 which controls admission of fluid to, and releases fluid from, the various cylinders 34. Operation of such a control valve is described in detail in applicant's earlier application U.S. Ser. No. 301,442.

Ball screw structures are very simple, very reliable and quietly operating, and they are quite inexpensive elements. Furthermore, they require little space. The arrangement described herein therefore provides a traction roller transmission which may be small, reliable and less expensive than those known so far.

I claim:

1. An infinitely variable traction roller transmission comprising: coaxial input and output shafts; toric traction discs mounted opposite each other, one on each of said shafts; at least two motion transmitting traction rollers arranged between, and in firm engagement with, said toric discs for the transmission of motion therebetween; a pivotal support trunnion for each of said traction rollers rotatably supporting said rollers and being supported pivotally about an axis which extends normal to a plane including the axis of said input and output shafts to permit changes of the ratio of power transmission from the input to the output shaft; means for axially moving said trunnions to initiate transmission ratio changing pivoting thereof; and a ball screw structure operatively associated with at least one of said trunnions, one part of said ball screw structure having a predetermined axial position relative to said trunnion depending on the trunnions pivot position.

2. A transmission as claimed in claim 1, wherein said means for axially moving said trunnions is a piston disposed in a cylinder and said piston is connected to said ball screw structure for application of trunnion moving precess forces.

3. A transmission as claimed in claim 1, wherein said means for axially moving said trunnions is a piston disposed in a cylinder and abutting said trunnion and said ball screw structure has a stem extending through said piston and cylinder and having its free end associated with a valve controlling fluid flow to and from said cylinder.

4. A transmission as claimed in claim 3, wherein said trunnions have piston and cylinder arrangements disposed at all axial ends, admission of fluid to and release thereof from, said cylinders being controlled by said valve.

* * * * *